(12) United States Patent
Yamamoto

(10) Patent No.: US 12,671,779 B2
(45) Date of Patent: Jun. 30, 2026

(54) INFORMATION PROCESSING APPARATUS AND NON-TRANSITORY COMPUTER READABLE MEDIUM STORING PROGRAM FOR NOTIFYING EXISTENCE OF USABLE BUT NON-HELD DATA

(71) Applicant: FUJIFILM Business Innovation Corp., Tokyo (JP)

(72) Inventor: Norio Yamamoto, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/981,482

(22) Filed: Nov. 7, 2022

(65) Prior Publication Data

US 2024/0007580 A1 Jan. 4, 2024

(30) Foreign Application Priority Data

Jun. 29, 2022 (JP) ................................. 2022-104195

(51) Int. Cl.
*H04N 1/00* (2006.01)
*H04N 1/44* (2006.01)

(52) U.S. Cl.
CPC ......... *H04N 1/444* (2013.01); *H04N 1/00217* (2013.01); *H04N 1/00244* (2013.01)

(58) Field of Classification Search
None
See application file for complete search history.

(56) References Cited

U.S. PATENT DOCUMENTS

2007/0165285 A1* 7/2007 Inada ................... H04N 1/4095
358/448
2013/0077786 A1* 3/2013 Sato ..................... H04N 1/4433
358/1.14

(Continued)

FOREIGN PATENT DOCUMENTS

JP 2019040327 3/2019
JP 2019040327 A * 3/2019

OTHER PUBLICATIONS

"Notice of Reasons for Refusal of Japan Counterpart Application", issued on Apr. 14, 2026, with English translation thereof, p. 1-p. 4.

*Primary Examiner* — Abderrahim Merouan
*Assistant Examiner* — Pawan Dhingra
(74) *Attorney, Agent, or Firm* — JCIPRNET

(57) ABSTRACT

An information processing apparatus installed inside a local network system that provides a service to a user, includes a processor configured to acquire data used in a case of providing the service and security level information indicating whether the data is first data of a first security level which is capable of being held and used by another information processing apparatus that provides the service outside the local network system, second data of a second security level which is not held but is capable of being used, or third data of a third security level which is not capable of being held and used; hold the acquired data in association with the security level information of the data in the local network system; and, when performing synchronization processing on usage data, which is used in the case of providing the service and includes one or more of the data, with the other information processing apparatus, transmit the first data included in the usage data and second data presence/absence information indicating whether the second data is included in the usage data.

9 Claims, 11 Drawing Sheets

(56) References Cited

U.S. PATENT DOCUMENTS

| | | | |
|---|---|---|---|
| 2014/0320883 A1* | 10/2014 | Ichida | G06F 3/1238 |
| | | | 358/1.14 |
| 2017/0068823 A1* | 3/2017 | Stepanov | H04L 63/08 |
| 2019/0026352 A1* | 1/2019 | Marathe | G06F 16/907 |
| 2019/0227758 A1* | 7/2019 | Suzuki | H04N 1/0001 |
| 2023/0300265 A1* | 9/2023 | Mizuno | H04N 1/00482 |
| | | | 358/1.16 |
| 2023/0308556 A1* | 9/2023 | Zhang | H04N 1/00209 |
| 2023/0412743 A1* | 12/2023 | Komatsu | H04N 1/00493 |

* cited by examiner

FIG. 2

| NEW CONTACT DESTINATION |
| --- |

DISPLAY NAME:          USER A

MAIL ADDRESS:          userA@a. com

SECURITY LEVEL:        PUBLIC ▽

FIG. 3

ADDRESS BOOK (REAL DEVICE)

| DISPLAY NAME | MAIL ADDRESS | SECURITY LEVEL |
| --- | --- | --- |
| USER A | userA@a. com | PUBLIC |
| USER B | userB@a. com | PUBLIC |
| USER C | userC@a. com | COMPLETELY CONFIDENTIAL |

FIG. 4

| PRINT | | |
|---|---|---|
| DOCUMENT NAME: | INVOICE. pdf | |
| PRINT SETTING: | | SETTING ··· |
| SECURITY LEVEL: | DATA LOCAL | ▽ |

FIG. 5

JOB INFORMATION (REAL DEVICE)

| DOCUMENT NAME | RESULT | HOST NAME | USER | DATE AND TIME | SECURITY LEVEL |
|---|---|---|---|---|---|
| INVOICE. pdf | NORMAL END | 123. 456. 789. 0 | USER D | 09/ 01/ 2022 | DATA LOCAL |
| SPECIFICATION. ppt | NORMAL END | 123. 456. 789. 1 | USER E | 09/ 02/ 2022 | COMPLETELY CONFIDENTIAL |
| MANUAL. doc | NORMAL END | 123. 456. 789. 2 | USER F | 09/ 03/ 2022 | PUBLIC |

FIG. 7

ADDRESS BOOK (VIRTUAL DEVICE)

| DISPLAY NAME | MAIL ADDRESS |
|---|---|
| USER A | userA@a. com |
| USER B | userB@a. com |

| DATA LOCAL PRESENCE/ABSENCE INFORMATION |
|---|
| ABSENCE |

FIG. 8

JOB INFORMATION (VIRTUAL DEVICE)

| DOCUMENT NAME | RESULT | HOST NAME | USER | DATE AND TIME |
|---|---|---|---|---|
| MANUAL. doc | NORMAL END | 123. 456. 789. 2 | USER F | 09/ 03/ 2022 |

| DATA LOCAL PRESENCE/ABSENCE INFORMATION |
|---|
| PRESENCE |

FIG. 10

ADDRESS BOOK (REAL DEVICE): AFTER CHANGE

| DISPLAY NAME | MAIL ADDRESS | SECURITY LEVEL |
|---|---|---|
| USER A | userA@a. com | PUBLIC |
| USER B | userB@a. com | DATA LOCAL |
| USER C | userC@a. com | COMPLETELY CONFIDENTIAL |

FIG. 11

ADDRESS BOOK (VIRTUAL DEVICE):
AFTER CHANGE

| DISPLAY NAME | MAIL ADDRESS |
|---|---|
| USER A | userA@a. com |

| DATA LOCAL PRESENCE/ABSENCE INFORMATION |
|---|
| PRESENCE |

FIG. 12

JOB INFORMATION (REAL DEVICE): AFTER CHANGE

| DOCUMENT NAME | RESULT | HOST NAME | USER | DATE AND TIME | SECURITY LEVEL |
|---|---|---|---|---|---|
| INVOICE. pdf | NORMAL END | 123. 456. 789. 0 | USER D | 09/ 01/ 2022 | PUBLIC |
| SPECIFICATION. ppt | NORMAL END | 123. 456. 789. 1 | USER E | 09/ 02/ 2022 | COMPLETELY CONFIDENTIAL |
| MANUAL. doc | NORMAL END | 123. 456. 789. 2 | USER F | 09/ 03/ 2022 | PUBLIC |

FIG. 13

JOB INFORMATION (VIRTUAL DEVICE): AFTER CHANGE

| DOCUMENT NAME | RESULT | HOST NAME | USER | DATE AND TIME |
|---|---|---|---|---|
| INVOICE. pdf | NORMAL END | 123. 456. 789. 0 | USER D | 09/ 01/ 2022 |
| MANUAL. doc | NORMAL END | 123. 456. 789. 2 | USER F | 09/ 03/ 2022 |

| DATA LOCAL PRESENCE/ABSENCE INFORMATION |
|---|
| ABSENCE |

FIG. 14

Scan to Mail

DESTINATION:          USER C  ▽

SCAN SETTING:                    SETTING ⋯

SECURITY LEVEL:      COMPLETELY ~~CONFIDENTIAL~~  ▽

PUBLIC

DATA LOCAL

COMPLETELY
CONFIDENTIAL

FIG. 15

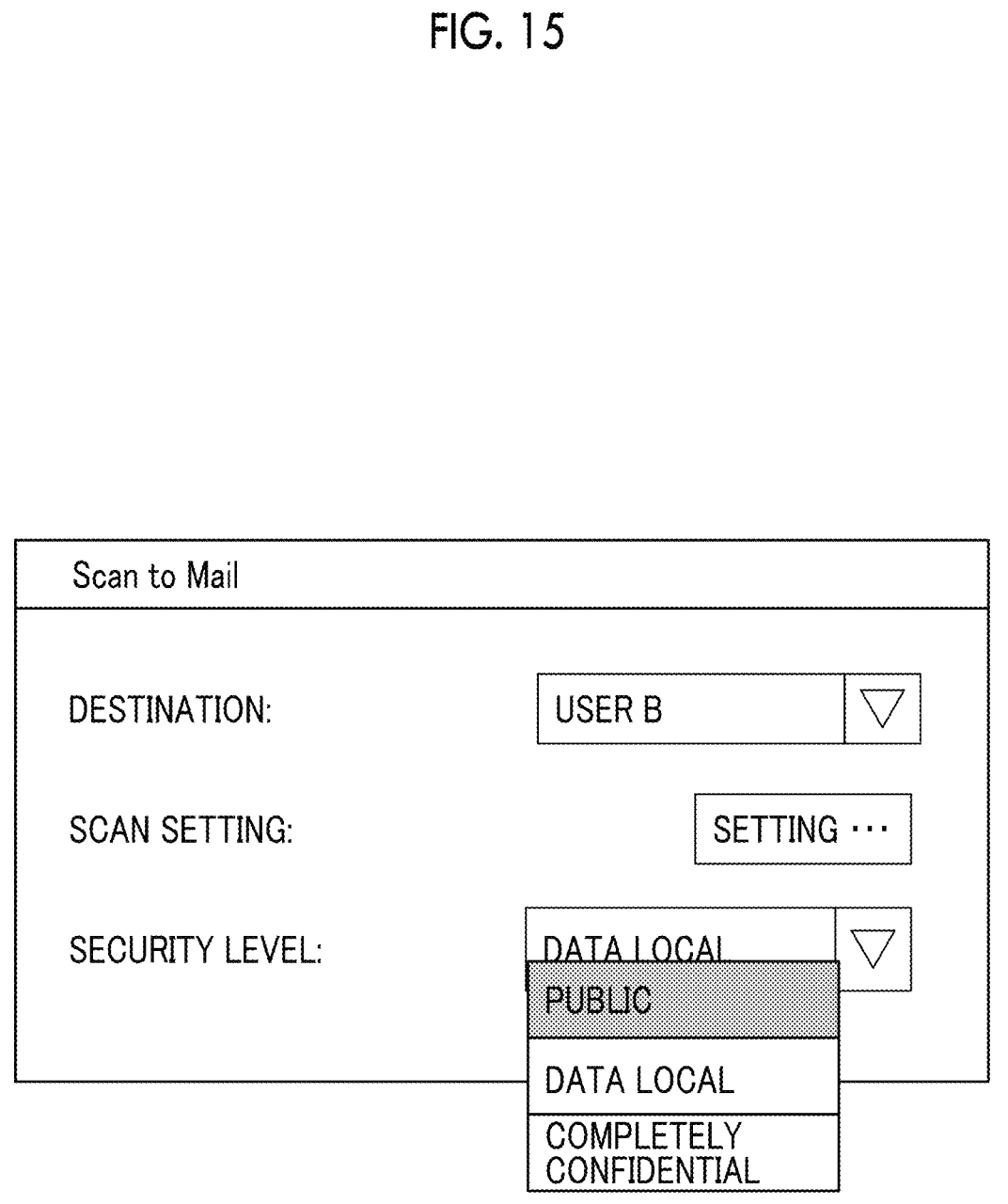

| Scan to Mail | | |
|---|---|---|
| DESTINATION: | USER B | ▽ |
| SCAN SETTING: | | SETTING ··· |
| SECURITY LEVEL: | DATA LOCAL | ▽ |
| | PUBLIC | |
| | DATA LOCAL | |
| | COMPLETELY CONFIDENTIAL | |

INFORMATION PROCESSING APPARATUS AND NON-TRANSITORY COMPUTER READABLE MEDIUM STORING PROGRAM FOR NOTIFYING EXISTENCE OF USABLE BUT NON-HELD DATA

CROSS-REFERENCE TO RELATED APPLICATIONS

This application is based on and claims priority under 35 USC 119 from Japanese Patent Application No. 2022-104195 filed Jun. 29, 2022.

BACKGROUND

(i) Technical Field

The present invention relates to an information processing apparatus and a non-transitory computer readable medium storing a program.

(ii) Related Art

Recently, attempts have been made to provide a cloud service by causing a multifunction machine to cooperate with a virtual device corresponding to the multifunction machine. As a result, a user can use a service such as image processing provided by the multifunction machine by accessing the virtual device on the cloud without directly accessing the multifunction machine.

In JP2019-040327A, it is possible to switch between execution of processing in an on-premises environment and execution in a cloud environment based on data and work-flow characteristics.

By the way, highly confidential data may exist in data handled in a case of providing the service. From the view-point of security, holding highly confidential data in the cloud increases the risk such as data leakage compared as a case of keeping the data in the on-premises environment. Therefore, in a case where it is possible, a state in which the highly confidential data is held on the cloud is not left.

SUMMARY

In the related art, in terms of security, it is possible to prevent highly confidential data from being published, that is, from being held or used outside a local network system. On the other hand, as long as the data is not highly confidential, it is possible to publish the data, that is, it is possible to hold and use the data outside the local network system.

However, among the data handled for the service, data may exist that is not held outside the local network system but is used to provide equivalent service as inside the local network system from outside the local network system, that is, data which is handled in an intermediate position.

However, in the related art, the intermediate data is not handled from the viewpoint of the security. Therefore, the existence of the intermediate data is not informed to outside the local network system.

Aspects of non-limiting embodiments of the present disclosure relate to an information processing apparatus that informs other information processing apparatuses installed outside a network of the existence of usable data that is not held.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus installed inside a local network system that provides a service to a user, the information processing apparatus including a processor configured to: acquire data used in a case of providing the service and security level information indicating whether the data is first data of a first security level which is capable of being held and used by another information processing apparatus that provides the service outside the local network system, second data of a second security level which is not held but is capable of being used, or third data of a third security level which is not capable of being held and used; hold the acquired data in association with the security level information of the data in the local network system; and, when performing synchronization processing on usage data, which is used in the case of providing the service and includes one or more of the data, with the other information processing apparatus, transmit the first data included in the usage data and second data presence/absence information indicating whether the second data is included in the usage data.

BRIEF DESCRIPTION OF THE DRAWINGS

Exemplary embodiment(s) of the present invention will be described in detail based on the following figures, wherein:

FIG. 2 is a diagram showing an example of a data registration screen according to the present exemplary embodiment;

FIG. 3 is a diagram showing an example of the data configuration of an address book set and registered in a data storage unit of a real device according to the present exemplary embodiment;

FIG. 4 is a diagram showing another example of the data registration screen according to the present exemplary embodiment;

FIG. 5 is a diagram showing an example of the data configuration of job information set and registered in the data storage unit of the real device according to the present exemplary embodiment;

FIG. 7 is a diagram showing an example of a data configuration related to an address book registered in a data storage unit of a virtual device according to the present exemplary embodiment;

FIG. 8 is a diagram showing an example of a data configuration related to job information registered in the data storage unit of the virtual device according to the present exemplary embodiment;

FIG. 10 is a diagram showing a setting example after changing a part of the data of the address book shown in FIG. 3;

FIG. 11 is a diagram showing an example of a data configuration related to the address book set in the data storage unit of the virtual device after setting content of the data of the address book is changed and the synchronization processing is executed in the present exemplary embodiment;

FIG. 12 is a diagram showing a setting example after changing a part of the data of the job information shown in FIG. 5;

FIG. 13 is a diagram showing an example of a data configuration related to the job information set in the data storage unit of the virtual device after setting content of the data of the job information is changed and the synchronization processing is executed in the present exemplary embodiment;

FIG. 14 is a diagram showing an example of a setting screen for setting a security level for the job information generated by executing a scan transmission service in the present exemplary embodiment; and FIG. 15 is a diagram showing another example of the setting screen for setting the security level for the job information generated by executing the scan transmission service in the present exemplary embodiment.

DETAILED DESCRIPTION

Hereinafter, an exemplary embodiment of the present invention will be described with reference to the accompanying drawings.

Figure 1:
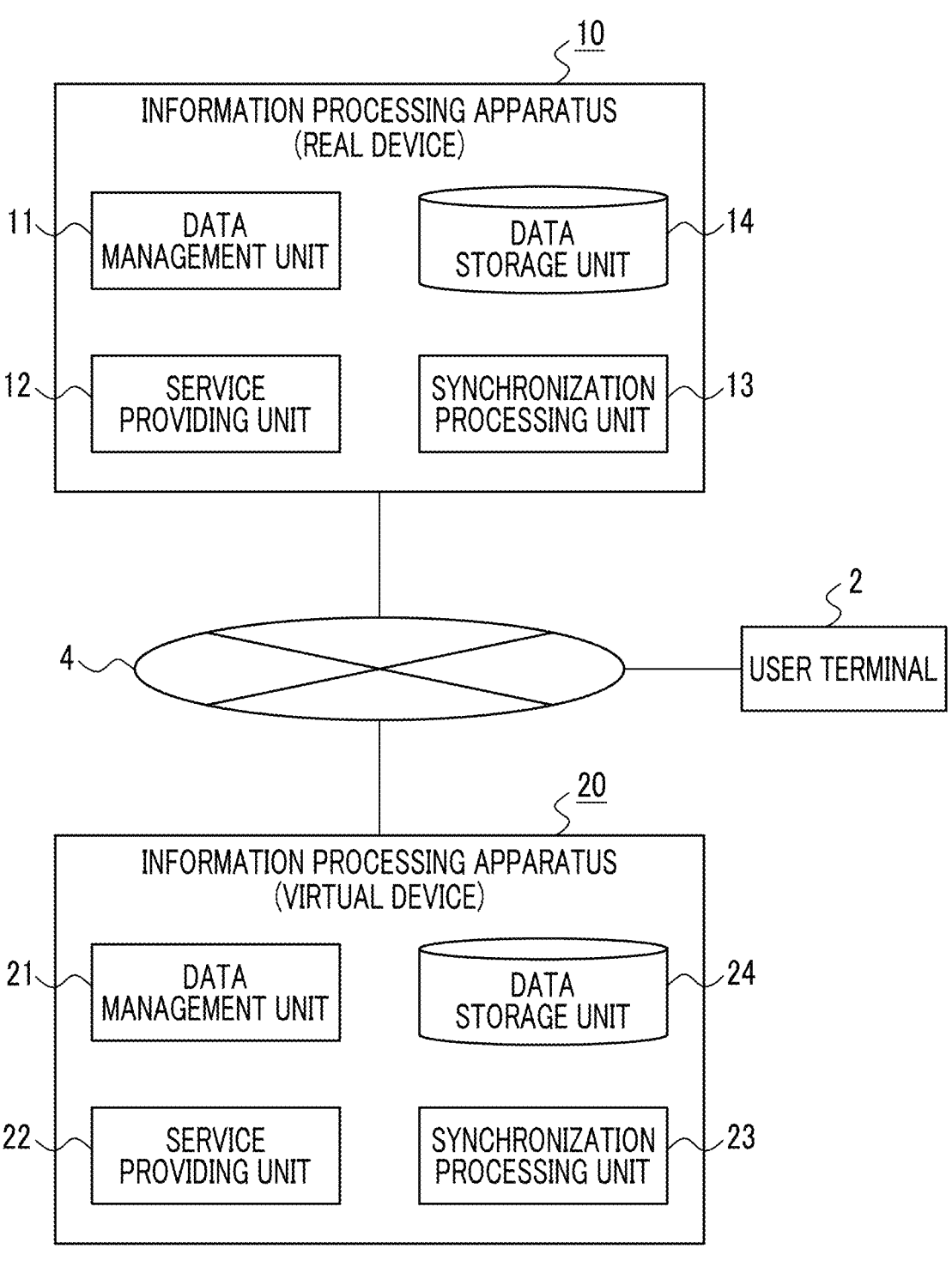
FIG. 1 is a configuration diagram showing a service system according to one exemplary embodiment of the present invention.

FIG. 1 is a configuration diagram showing a service system according to one exemplary embodiment of the present invention. In addition, FIG. 1 is also a diagram showing a block configuration of each information processing apparatus. FIG. 1 shows a service system in which information processing apparatuses 10 and 20 and a user terminal 2 are connected via a network 4 such as the Internet.

The information processing apparatus 10 is installed inside a local network system, which is generally called an on-premises environment, of a company that provides a service to a user. On the other hand, the information processing apparatus 20 is installed outside the local network system and communicates with the information processing apparatus 10 via the network 4. As an example of the outside of the local network system, a cloud environment is assumed in the present exemplary embodiment. Of course, the outside of the local network system need not be limited to the cloud environment, and the information processing apparatus 10 may be installed in, for example, a system of another company such as a branch office or an agency. The information processing apparatus 20 is another information processing apparatus constructed separately from the information processing apparatus 10, but provides an equivalent service as the information processing apparatus 10. Since the information processing apparatus 20 according to the present exemplary embodiment has a device shadow function of the information processing apparatus 10, the information processing apparatus 20 is constructed by being positioned as the virtual device of the information processing apparatus 10. In the following description, the information processing apparatus 10 is an information processing apparatus that actually exists, thereby being also referred to as a "real device". In addition, the information processing apparatus 20 is an information processing apparatus that is virtually constructed on the cloud, thereby being also referred to as a "virtual device".

The user terminal 2 is an information terminal apparatus used by the user who uses the service provided by the information processing apparatuses 10 and 20. The user terminal 2 can be realized by a personal computer (PC), a tablet terminal, or an information terminal apparatus, such as a smartphone, which is installed with a communication function capable of accessing the network 4. A user of the user terminal 2 may selectively use the service provided by either the information processing apparatus 10 or 20. Although only one user terminal 2 is illustrated in FIG. 1, a plurality of user terminals 2 may be connected to the network 4.

The information processing apparatus 10 can be realized with a general-purpose hardware configuration, such as a PC, which exists from the related art. That is, the information processing apparatus 10 includes a user interface including storage means such as a CPU, a ROM, a RAM, and a Hard Disk Drive (HDD), communication means such as a network interface for accessing the network 4, input means such as a mouse and a keyboard, and display means such as a display.

The information processing apparatus 10 has a data management unit 11, a service providing unit 12, a synchronization processing unit 13, and a data storage unit 14. Components not used for the description of the present exemplary embodiment are omitted from FIG. 1.

The data management unit 11 performs data management such as registration, update, and deletion of various data used for the service. The service providing unit 12 provides the service to the user by executing a service function of the information processing apparatus 10. The synchronization processing unit 13 executes the synchronization processing for synchronizing data used in a case of providing the service between the real device 10 and the virtual device 20. The data storage unit 14 stores data used in the case of providing the service. A specific configuration and the like of the data will be described later.

The respective components 11 to 13 of the information processing apparatus 10 are realized by a cooperative operation of a computer for forming the information processing apparatus 10 and a program operated by a CPU installed in the computer. In addition, the data storage unit 14 is realized by the HDD installed in the information processing apparatus 10. Alternatively, the RAM or the storage means in the local network system may be used via a local network.

The information processing apparatus 20 is a virtual information processing apparatus, and is realized by one or more server computers or the like on the cloud. Of course, since the server computer is a computer, the server computer includes a CPU, a ROM, a RAM, a storage means, a communication means, and the like.

Since the information processing apparatus 20 has equivalent functions as the information processing apparatus 10, the information processing apparatus 20 has a data management unit 21, a service providing unit 22, a synchronization processing unit 23, and a data storage unit 24 as the same the respective components 11 to 14 included in the information processing apparatus 10. Here, the synchronization processing unit 23 executes synchronization processing by cooperating with the synchronization processing unit 13. The data management unit 21 performs data management such as the update of data stored in the data storage unit 24 using the data acquired from the information processing apparatus 10 through the synchronization processing. Although the service providing unit 22 provides a service to the user as the same as the service providing unit 12, operation content is slightly different from the operation content of the service providing unit 12. This point will be described later. In addition, although the data storage unit 24 also stores data used in the case of providing the service as the same as the data storage unit 14, the configuration of the data to be held is slightly different from the configuration of the data of the data storage unit 14. This point will be described later.

The respective components 21 to 23 of the information processing apparatus 20 are realized by a cooperative operation of one or more server computers for forming the information processing apparatus 20 and a program operated by a CPU installed in the server computer. In addition, the data storage unit 24 is realized by the HDD or the RAM on the cloud.

In addition, the program used in the present exemplary embodiment can be provided by the communication means and can be provided by being stored in a computer-readable recording medium such as a USB memory. The program provided from the communication means or the recording medium is installed in the computer, and the CPU of the computer sequentially executes the program, thereby realizing various processes.

Next, the data used when providing the service in the present exemplary embodiment will be described.

FIG. 2 is a diagram showing an example of a data registration screen displayed on the display means, such as a display, of the real device 10. FIG. 2 shows an example of a screen for registering a contact destination used in a mail function. In a case where the information processing apparatus 10 or 20 provides a mail address search service, a service provider or the like sets contact destination information from the contact destination registration screen shown in FIG. 2. In the present exemplary embodiment, as shown in FIG. 2, a display name, a mail address, and a security level are set. Of course, other information may be added. The mail address is address information to be the destination of a mail, and the display name is information for specifying an individual displayed on the screen in place of the mail address. Further, the security level is characteristic information in the present exemplary embodiment. The data management unit 11 acquires data, which is set by the service provider or the like from the registration screen shown in FIG. 2, and the security level of the data, and sets and registers the data and the security level in the data storage unit 14.

Here, the security level that is characterized in the present exemplary embodiment will be described.

In the present exemplary embodiment, three types of levels are prepared as the security level, and the security level is set for each data. As described above, the real device 10 according to the present exemplary embodiment allows the virtual device 20 to provide the equivalent service, and a first security level is a level at which the virtual device 20 can hold and use the data. In the present exemplary embodiment, the first security level is referred to as "public". In addition, the data of the first security level is referred to as "first data" or "public data". A second security level is a level at which the virtual device 20 does not hold the data but can use the data. In the present exemplary embodiment, the second security level is referred to as "data local". In addition, the data of the second security level will be referred to as "second data" or "data local data". A third security level is a level at which the virtual device 20 cannot hold or use the data. In the present exemplary embodiment, the third security level is referred to as "completely confidential". In addition, the data of the third security level will be referred to as "third data" or "completely confidential data".

As described above, the security level of the data is first data <second data <third data. That is, the security level of the data is highest for the third data and lowest for the first data. Further, in the present exemplary embodiment, it is possible to set the second data, which has the intermediate position, in terms of security. In the present exemplary embodiment, only the second security level is used as the security level at the intermediate position for the sake of convenience, but a plurality of levels may be set.

FIG. 3 is a diagram showing an example of the data configuration of an address book set and registered in the data storage unit 14 according to the present exemplary embodiment. In the address book, personal data is set and registered, which is generated by associating the data (that is, the display name and the mail address) used for providing the service set from the registration screen illustrated in FIG. 2 with the information indicating the security level of the data.

FIG. 4 is a diagram showing another example of the data registration screen displayed on the display means, such as the display, of the real device 10. FIG. 4 shows an example of a screen for registering a document used in a print function. In a case where the information processing apparatus 10 or 20 provides a document printing service, the service provider or the like sets and registers document information from the document registration screen shown in FIG. 4. In the present exemplary embodiment, as illustrated in FIG. 4, a document name, print setting, and the security level are set. Of course, other information may be added. The document name is information specifying a document to be printed, and the name of the document is set. In the print setting, attribute information in a case of printing is set. Normally, a paper size, a color attribute, and the like are set, but the settings of the paper size, the color attribute, and the like are not characteristics of the present exemplary embodiment, thereby being omitted. The security level is described above.

FIG. 5 is a diagram showing an example of the data configuration of job information set and registered in the data storage unit 14 according to the present exemplary embodiment. Since the printing service is used as an example here, the job information corresponds to print log information generated in a case where printing is executed. The job information includes a document name, a result, a host name, a user, date and time, and a security level. Items other than the security level may be the same as job information existing from before. A security level, which is set for the document to be printed from the registration screen shown in FIG. 4, is set for the job information corresponding to the data according to the present exemplary embodiment. For example, referring to the registration screen shown in FIG. 4, since the second security level "data local" is set for a document "invoice.pdf", "data local" is set as the security level in the job information generated by printing "invoice.pdf".

Figure 6:
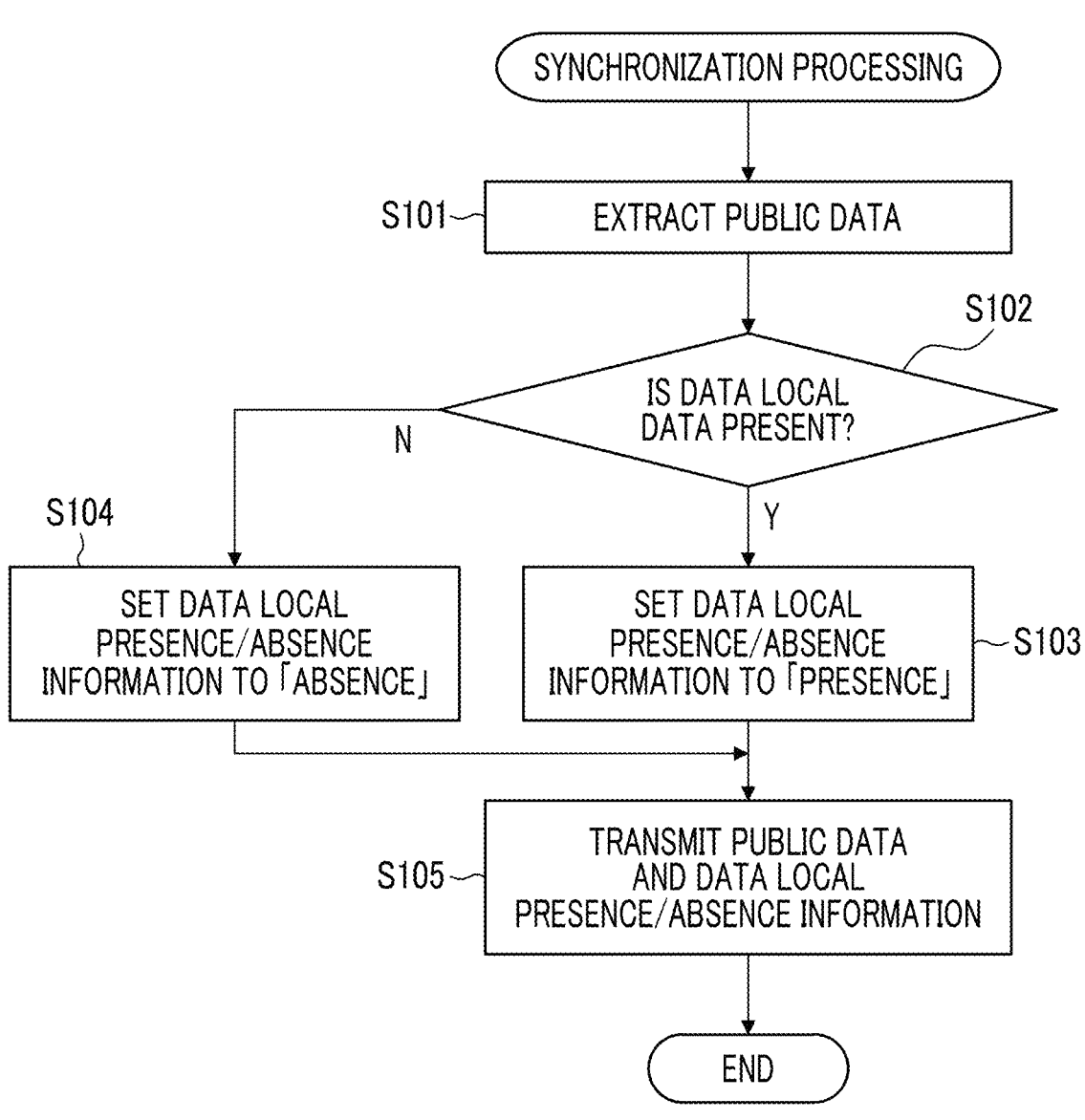
FIG. 6 is a flowchart showing synchronization processing of the real device according to the present exemplary embodiment.

The data shown in FIGS. 3 and 5 are examples of the data set and registered in the data storage unit 14 of the real device 10 as usage data used in the case of providing the service. The data of the virtual device 20 and the data of the real device 10 are synchronized by the synchronization processing. Here, the synchronization processing according to the present exemplary embodiment will be described with reference to a flowchart shown in FIG. 6. FIG. 6 shows the synchronization processing as the processing of the real device 10.

The synchronization processing is executed at a predetermined timing. For example, the synchronization processing may be performed periodically, or may be performed sequentially at a timing in which data is newly registered.

For data to be transmitted, for example, flag information indicating non-synchronization for unsynchronized data may be associated with the data and hold. Alternatively, specific information of the unsynchronized data may be registered in a predetermined unsynchronized file, and the specific information of the data may be deleted from the unsynchronized file at a timing of transmission.

First, the synchronization processing unit 13 refers to the data storage unit 14, and extracts the data whose security level included in the usage data is "public", that is, the public data (step S101). Subsequently, the synchronization processing unit 13 checks whether or not the data whose security level is "data local", that is, the data local data exists in the usage data. In a case where the data local data exists (Y in step S102), "presence" is set to data local presence/absence information (step S103). In a case where the data local data does not exist (N in step S102), "absence" is set to the data local presence/absence information (step S104). As above, the data local presence/absence information corresponds to second data presence/absence information, and functions as the flag information indicating whether or not the data local data exists in the usage data. Further, the synchronization processing unit 13 transmits the extracted public data and data local presence/absence information to the virtual device 20 (step S105).

The synchronization processing unit 23 of the virtual device 20 acquires the data transmitted from the synchronization processing unit 13. In addition, the synchronization processing unit 13 and the synchronization processing unit 23 are always connected to a synchronization path to enable a cooperation operation at a predetermined timing. In a case where the synchronization processing unit 23 acquires the data, the data management unit 21 holds the acquired data by setting and registering the data in the data storage unit 24. In the present exemplary embodiment, the real device 10 and the virtual device 20 are synchronized with each other in this way.

Here, the synchronization processing will be described more specifically with reference to the drawings.

It is assumed that data is registered in the real device 10 as in the address book shown in FIG. 3. That is, each of the data of users A, B, and C corresponds to the usage data. In this case, in step S101, the data of the user A and the data of the user B, which correspond to the public data, are extracted. In addition, since the data local data is not set in the address book, "absence" is set to the data local presence/absence information.

In a case where the virtual device 20 acquires data transmitted from the real device 10, the data is registered in the data storage unit 24. FIG. 7 shows a configuration of the data registered in the data storage unit 24. As is clear from FIG. 7, in the address book stored in the data storage unit 24 of the virtual device 20, only the public data is registered among the data set in the address book of the real device 10, in other words, the usage data. In addition, in the data storage unit 24 of the virtual device 20, "absence" is registered in the data local presence/absence information corresponding to the address book. The data related to the address book indicates the data registered in the address book and the data local presence/absence information associated with the address book.

Hereinabove, the address book is described as an example, and specific description will be performed using the job information. Since the synchronization processing is the same, the description thereof will be omitted. In the case of the job information, as shown in FIG. 5, each of the data of "invoice.pdf", "specification.ppt" and "manual.doc" corresponds to the usage data. In this case, in step S101, the data of the job information "manual.doc" corresponding to the public data is extracted. Further, the job information of the data local data "invoice.pdf" exists in the usage data, so that "presence" is set in the data local presence/absence information.

In a case where the virtual device 20 acquires data transmitted from the real device 10, the data is registered in the data storage unit 24. FIG. 8 shows the configuration of the data registered in the data storage unit 24. As is clear from FIG. 8, the job information stored in the data storage unit 24 of the virtual device 20 is registered with only the public data among the data set in the job information of the real device 10, in other words, the usage data. In addition, in the data storage unit 24 of the virtual device 20, "presence" is registered in the data local presence/absence information corresponding to the job information. The data related to the job information indicates the data of the job information and the data local presence/absence information associated with the job information.

In the present exemplary embodiment, data is synchronized between the real device 10 and the virtual device 20 as described above. The public data is held in the virtual device 20 in the synchronization processing according to the present exemplary embodiment. Even the existence of the completely confidential data is not notified to the virtual device 20. Further, the data local data is not held in the virtual device 20 but the existence thereof is informed.

Figure 9:
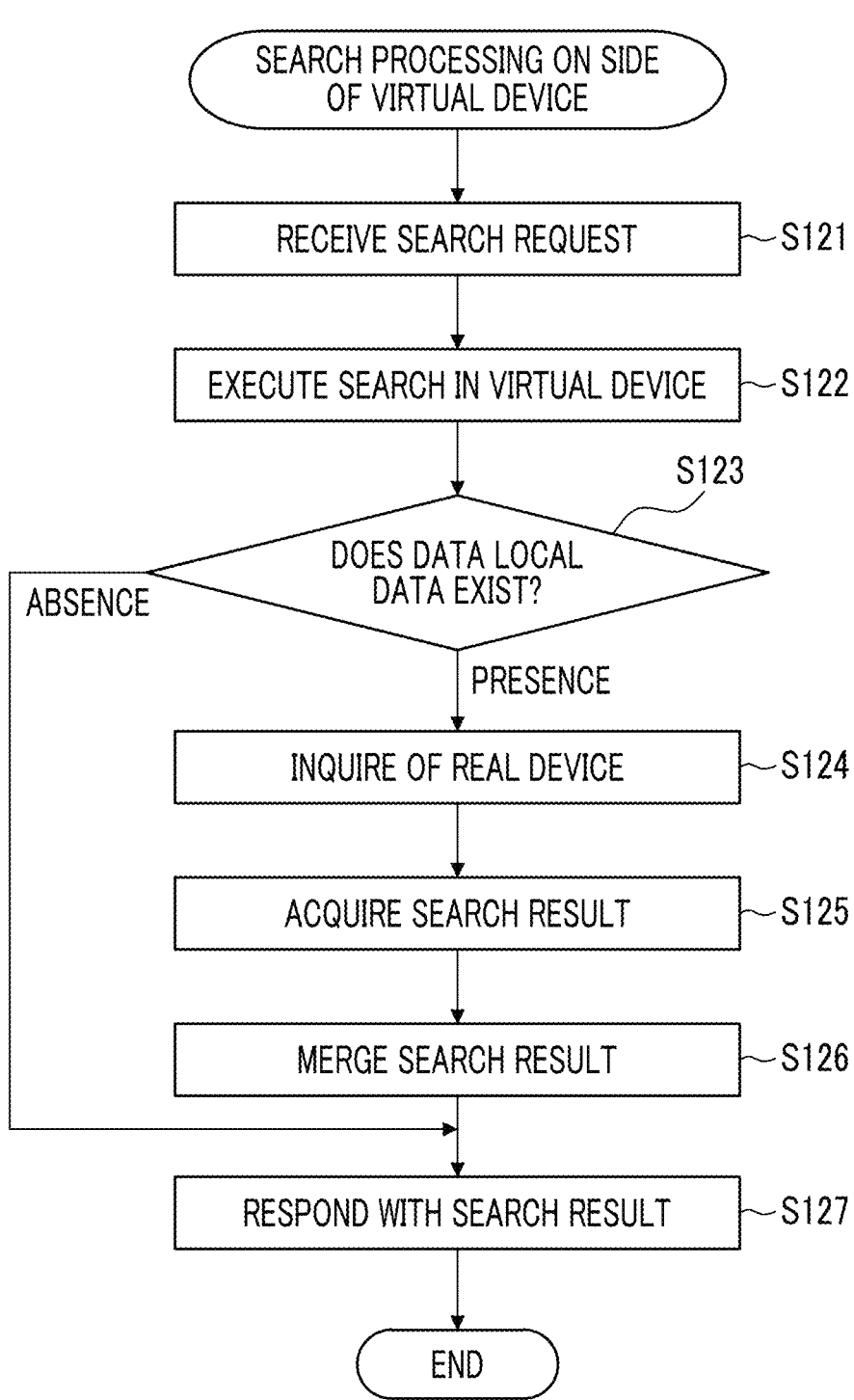
FIG. 9 is a flowchart showing search processing on a side of the virtual device according to the present exemplary embodiment.

Subsequently, a case will be described where the service system according to the present exemplary embodiment provides the search service to the user in response to a request from the user. First, search processing executed by the virtual device 20 will be described using the flowchart shown in FIG. 9.

In a case where the service providing unit 22 of the virtual device 20 receives a search request from the user, the search request being transmitted from the user terminal 2 (step S121), the service providing unit 22 executes a search to the data storage unit 24 of the virtual device 20 (step S122). Here, in a case where a search target is the address book, as shown in FIG. 7, the data for the user A and the data for the user B exist, so that two data are acquired by the search. Subsequently, the service providing unit 22 refers to the data local presence/absence information, and controls transmission of a usage data transmission request to the real device 10 according to the setting content of the data local presence/absence information. According to FIG. 7, the data local presence/absence information corresponding to the address book is set to "absence" ("absence" in step S123), so that the service providing unit 22 does not transmit the usage data transmission request to the real device 10. That is, the service providing unit 22 responds to the user with the data of the user A and the data of the user B, which are already acquired from the real device 10 and held inside, as the search result (step S127). The service providing unit 22 provides the service to the user in this way.

Here, in a case where the search target is the job information, as shown in FIG. 8, data of the job information of "manual.doc" exists, so that one data is acquired by executing the search in step S122. Subsequently, the service providing unit 22 refers to the data local presence/absence information. According to FIG. 8, the data local presence/absence information corresponding to the job information is set to "presence" ("presence" in step S123), so that the service providing unit 22 performs the usage data transmission request.

Since the public data is completely acquired, the usage data referred to here corresponds to the data local data. That is, the service providing unit 22 inquires of the real device 10 about the data local data (step S124).

The service providing unit 12 of the real device 10 searches for the job information in response to an inquiry (that is, the usage data transmission request) from the virtual device 20. The job information of "invoice.pdf" whose security level is "data local" exists in the job information as shown in FIG. 5, so that the service providing unit 12 returns the job information of "invoice.pdf" as the search result.

In a case where the service providing unit 22 of the virtual device 20 acquires the search result from the real device 10 (step S125), the service providing unit 22 merges the acquired search result with the result of the search executed by the service providing unit 22 in step S122 (step S126). Further, the service providing unit 22 responds to the user with the job information of "manual.doc" and the job information of "invoice.pdf", which are obtained through merging, as the search result (step S127). The service providing unit 22 provides the service to the user in this way.

In the present exemplary embodiment, as described above, the data of the second security level is not held in the virtual device 20, but may be used when providing the service. Further, the virtual device 20 operates independently to provide the service in a case where the data of the second security level does not exist in the real device 10. On the other hand, in a case where the data of the second security level exists in the real device 10, the virtual device 20 performs the cooperation operation with the real device 10 to provide the service.

Incidentally, in a case where the real device 10 provides the search service to the user in the same manner as the virtual device 20, the search result of the real device 10 also includes the completely confidential data unlike the virtual device 20. Therefore, the user needs to use the service after understanding the above fact.

By the way, although the virtual device 20 constructed on the cloud is described as an example of the information processing apparatus that provides the equivalent service as the real device 10, it is not necessary to be limited thereto. That is, the other information processing apparatus different from the real device 10 needs not be limited to a virtual information processing apparatus. For example, it is assumed that the other information processing apparatus is a real machine installed in a different agency from the installation location of the information processing apparatus 10. The agent may be domestic or international. Although it is considered that the agency should provide an equivalent service as the company, but, in terms of security, the agency is basically another company, so that there is a case where all data should not be provided. In such cases, it is convenient that the data of the second security level may be set.

FIG. 10 is a diagram showing a setting example after changing a part of the data of the address book shown in FIG. 3. The data management unit 11 updates the setting content of the address book according to an operation by a manager or the like. FIG. 10 shows an example in which the security level of the user B is changed from "public" to "data local".

The synchronization processing unit 13 executes the synchronization processing by performing the cooperation operation with the synchronization processing unit 23 at a predetermined timing. An example of the setting content of the data related to the address book on the side of the virtual device 20, which is updated as a result of the synchronization processing, is shown in FIG. 11. As the security level of the user B is changed from "public" to "data local", the data of the user B is deleted from the address book of the virtual device 20 and setting of the data local presence/absence information is changed to "presence", as shown in FIG. 11.

FIG. 12 is a diagram showing a setting example after changing a part of the data of the job information shown in FIG. 5. The data management unit 11 updates the setting content of the job information according to the operation of a manager or the like. FIG. 12 shows an example in which the security level of the job information generated by printing "invoice.pdf" is changed from "data local" to "public". With this change, the job information no longer has data whose security level is "data local."

The synchronization processing unit 13 executes the synchronization processing by performing the cooperation operation with the synchronization processing unit 23 at the predetermined timing. An example of setting content related to the job information on the side of the virtual device 20, which is updated as a result of the synchronization processing, is shown in FIG. 13. As the job information corresponding to "invoice.pdf" is changed from "data local" to "public", data corresponding to "invoice.pdf" is added and registered in the job information of the virtual device 20 and the setting of the data local presence/absence information is changed to "absence", as shown in FIG. 13.

Next, a case will be described in which the security level is set for the job information generated by executing a scan transmission service provided by effectively using the data completely registered in the address book and using a scan transmission (Scan to Mail) function.

FIG. 14 is a diagram showing an example of a setting screen for setting the security level for the job information generated by executing the scan transmission service. FIG. 14 exemplifies a case where the scan transmission service is executed with the user C as the destination. For the user C, as illustrated in FIG. 10, "completely confidential" is set as the security level. Therefore, "completely confidential" should be set to the job information related to the user C as the same as the User C. FIG. 14 shows an example of the user interface for setting the security level selected from a drop-down menu. According to the display example, the data management unit 11 displays the drop-down menu such that "public" and "data local" cannot be selected so that the security level lower than "completely confidential" is not set.

FIG. 15 is a diagram showing an example of a setting screen different from the setting screen in FIG. 14. In FIG. 15, the user B is the target of the destination. For the user B, as illustrated in FIG. 10, "data local" is set as the security level. Therefore, in the job information related to the user B, "data local" as the same as the user B or "completely confidential" higher than "data local" from the viewpoint of security should be set. Therefore, the data management unit 11 displays the drop-down menu such that "public" cannot be selected so that the security level lower than "data local" is not set. In other words, the data management unit 11 displays the drop-down menu such that "data local" as the same as the user B or "completely confidential" whose security level is higher than "data local" can be selected.

In this way, in a case where security level information is set for the job information generated by executing a job for executing a scan and transmission function, for the job, the security level information of the data (the data of the user C in FIG. 14 and the data of the user B in FIG. 15), which is selected by the user from among the data of the users (the users A to C) whose security level information is completely set, is referred, so that an appropriate security level can be set in the job information. Further, the job information for which the security level is set can be used in a case of providing the search service to the user as the same as the job information obtained by executing the printing service (for example, FIG. 5).

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus installed inside a local network system that provides a service to a user, the information processing apparatus comprising:

a processor configured to:

acquire data used when providing the service and security level information indicating whether the data is first data of a first security level which is capable of being held and used by another information processing apparatus that provides the service outside the local network system, second data of a second security level which is not held but is capable of being used by the other information processing apparatus, or third data of a third security level which is not capable of being held and used by the other information processing apparatus;

hold the acquired data in association with the security level information of the data in the local network system; and when performing synchronization processing on usage data, which is used in the case of providing the service and includes one or more of the data, with the other information processing apparatus, extract the first data included in the usage data and determine whether the second data is included in the usage data, and in response to the second data being included in the usage data, transmit, to the other information processing apparatus, the first data along with a determination result indicating that the second data is presence in the usage data, wherein the second data is not transmitted to the other information processing apparatus, and wherein the first data is public data, the second data is local data in the local network system, and the third data is completely confidential data.

2. The information processing apparatus according to claim 1, wherein the processor is configured to:

in response to a data transmission request from the other information processing apparatus, perform processing on the second data to generate processed second data and transmit the processed second data to the other information processing apparatus.

3. The information processing apparatus according to claim 1, wherein the processor is configured to:

in a case of setting the security level information to data which is used in the case of providing the service and generated by executing a job, refer to security level information of data related to the job and selected by the user from among data whose security level information is completely set.

4. The information processing apparatus according to claim 3, wherein the processor is configured to:

restrict a security level of the data generated by executing the job to be the same as or higher than a security level of the data selected by the user.

5. The information processing apparatus according to claim 1, wherein the processor is configured to:

in response to a data search request of the first data and the second data from the other information processing apparatus, merge the first data and the second data as a search result, and transmit the search result to the other information processing apparatus.

6. An information processing apparatus installed outside a local network system that provides a service to a user, the information processing apparatus comprising:

a processor configured to:

acquire first data of a first security level, which is capable of being held and used among data included in usage data used in a case of providing the service, and a determination result indicating second data of a second security level, which is not capable of being held but is capable of being used, is included in the usage data, from another information processing apparatus installed inside the local network system in response to the second data is included in the usage data, wherein the second data is not acquired by the information processing apparatus, and wherein the first data is public data and the second data is local data in the local network system;

hold the acquired first data and the determination result;

control transmission of a data transmission request for the usage data to the other information processing apparatus in response to the determination result indicating the second data being included in the usage data when providing the service; and provide the service by using data acquired from the other information processing apparatus among the usage data.

7. The information processing apparatus according to claim 6, wherein the processor is configured to:

in a case where the determination result indicates that the second data is not included, provide the service using the acquired first data without transmitting the data transmission request.

8. The information processing apparatus according to claim 6, wherein the processor is configured to:

in a case where the content of the determination result indicates that the second data is included, transmit the data transmission request to the other information processing apparatus; and provide the service using the acquired first data and processed second data in response to the data transmission request.

9. A non-transitory computer readable medium storing a program causing a computer, which is provided in an information processing apparatus installed inside a local network system that provides a service to a user, to execute:

a function of acquiring data used in a case of providing the service and security level information indicating whether the data is first data of a first security level which is capable of being held and used by another information processing apparatus that provides the service outside the local network system, second data of a second security level which is not held but is capable of being used by the other information processing apparatus, or third data of a third security level which is not capable of being held and used by the other information processing apparatus;

a function of holding the acquired data in association with the security level information of the data in the local network system; and a function of, when performing synchronization processing on usage data, which is used in the case of providing the service and includes one or more of the data, with the other information processing apparatus, extracting the first data included in the usage data and determining whether the second data is included in the usage data, and in response to the second data being included in the usage data, transmitting, to the other information processing apparatus, the first data along with a determination result indicating that the second data is presence in the usage data, wherein the second data is not transmitted to the other information processing apparatus, and wherein the first data is public data, the second data is local data in the local network system, and the third data is completely confidential data.

* * * * *